United States Patent
Hendrey et al.

(10) Patent No.: US 6,647,269 B2
(45) Date of Patent: Nov. 11, 2003

(54) METHOD AND SYSTEM FOR ANALYZING ADVERTISEMENTS DELIVERED TO A MOBILE UNIT

(75) Inventors: Geoffrey R. Hendrey, San Francisco, CA (US); Hirohisa A. Tanaka, Menlo Park, CA (US); Philip J. Koopman, Jr., Pittsburgh, PA (US)

(73) Assignee: Telcontar, San Jose, CA (US)

( * ) Notice: Subject to any disclaimer, the term of this patent is extended or adjusted under 35 U.S.C. 154(b) by 0 days.

(21) Appl. No.: 09/898,496

(22) Filed: Jul. 5, 2001

(65) Prior Publication Data

US 2002/0102993 A1 Aug. 1, 2002

Related U.S. Application Data

(60) Provisional application No. 60/223,614, filed on Aug. 7, 2000.

(51) Int. Cl.[7] ............................................... H04Q 7/20
(52) U.S. Cl. ...................... 455/456; 455/3.03; 455/414; 455/461; 705/14; 705/26
(58) Field of Search .................. 455/2.01, 3.03, 455/4.03, 4.05, 413, 414, 418, 456, 459, 466, 461; 705/14, 26, 27

(56) References Cited

U.S. PATENT DOCUMENTS

| | | | | |
|---|---|---|---|---|
| 5,966,696 A | * | 10/1999 | Giraud ........................ | 235/379 |
| 5,995,015 A | * | 11/1999 | DeTemple et al. ..... | 340/825.49 |
| 6,091,956 A | * | 7/2000 | Hollenberg .................. | 455/456 |
| 6,286,005 B1 | * | 9/2001 | Cannon ..................... | 455/2.01 |
| 6,332,127 B1 | * | 12/2001 | Bandera et al. ............... | 705/14 |
| 6,381,465 B1 | * | 4/2002 | Chern et al. ................ | 340/7.21 |
| 6,397,057 B1 | * | 5/2002 | Malackowski et al. ..... | 455/406 |
| 6,505,046 B1 | * | 1/2003 | Baker .......................... | 455/456 |

* cited by examiner

*Primary Examiner*—Nguyen T. Vo
*Assistant Examiner*—Simon Nguyen
(74) *Attorney, Agent, or Firm*—Fenwick & West LLP

(57) ABSTRACT

Accurate location information about a mobile telecommunication transceiver is used to generate advertising content responsive to a user approaching the location of a business. This advertising content is tailored to the user's preferences and the particular business involved. Once the advertising content is delivered, the position of the user is monitored to track the effectiveness of the advertisement. If the user enters the business' store and/or makes a purchase, the advertisement is logged as having been successful. If the user does not enter the store within a predetermined period of time or moves away from the store, the advertisement is considered to have been ineffective.

37 Claims, 2 Drawing Sheets

METHOD AND SYSTEM FOR ANALYZING ADVERTISEMENTS DELIVERED TO A MOBILE UNIT

This application claims priority to provisional U.S. Application Ser. No. 60/223,614, filed Aug. 7, 2000, incorporated herein by reference.

FIELD OF THE INVENTION

The present invention relates to mobile telecommunications systems in general, and more particularly to systems that have the ability to deliver advertisements to mobile units and determine a geographically precise location of mobile units in the mobile telecommunications system.

BACKGROUND OF THE INVENTION

Mobile telecommunication units (MUs) such as cell phones and other related devices have become a pervasive part of our culture. Historically, MUs have typically been treated as a movable version of a standard telephone. In particular, a main objective of current systems has been to hide the fact that the user of the MU is in fact mobile by providing a standard telephone number for reaching the MU regardless of location. Thus, MUs are typically used in a manner so as to conceal the location of the mobile user to make it appear to the outside world that the unit is a traditional stationary unit (SU). Similarly, when telecommunication system users (users) place phone calls using MUs, they dial traditional telephone numbers as if they were in their home location, making call placement appear to users of MUs as if they were in their home cities, regardless of their actual location.

The approximate location of an MU is always known to the telecommunication infrastructure in the form of which cell base station the MU is communicating with (e.g., as taught in U.S. Pat. No. 6,061,561). A prime motivation for being able to access such information is to determine the location of MU users who place calls to Emergency-911 call centers or are otherwise in distress. In order to improve the effectiveness of Emergency-911 services in particular, more accurate position information is being made available via the telecommunication infrastructure. For example, U.S. Pat. No. 6,067,045 teaches the use of combining Global Positioning System (GPS) information with a telecommunication infrastructure to accurately determine the position of an MU, whereas U.S. Pat. No. 6,055,434 teaches the use of low powered beacons scattered throughout MU usage areas. But, regardless of the technology used, the end result is that telecommunication systems are rapidly being provided with an ability to accurately determine the geographic location of an individual MU. The advent of precise location information for MUs has made possible new services dependent on a known location of a MU.

For instance, presently no one provides a service of sending advertising messages or coupons to mobile units based on the MU's location and further analyzing the effectiveness of the sent advertisement. While this has previously been done with respect to traditional telemarketing calls to a stationary telephone, such as in a person's home, it has previously been impossible to do with respect to MUs. In traditional telemarketing, effectiveness is determined by whether a customer places an order during the course of the traditional telephone call. However, most mobile users prefer not to receive voice telemarketing calls on their mobile telephones, as this consumes the user's allotted minutes, may cost the user money in usage fees, and in general interrupts the user in whatever he or she is doing. Thus, voice telemarketing calls are typically not placed to numbers known to belong to mobile telephones. As such, the same model of determining effectiveness cannot be used for non-voice messages sent to mobile devices.

Thus, a method and system of analyzing an advertisement delivered to a wireless device to determine whether the advertisement produced an intended result (e.g., the mobile user actually patronized the store to which the advertisement related) is needed.

SUMMARY OF THE INVENTION

In a first aspect of the invention there is a method for analyzing an advertisement received by a mobile communications device, comprising the steps of automatically monitoring the device's geographic location subsequent to receiving advertising data, and writing success information to a database when, within a predetermined amount of time, the mobile device enters a geographic location corresponding to a business with which the advertising data is associated.

In other aspects the invention is embodied in one ore more data processing devices and as computer readable instructions stored on a computer readable medium.

In some embodiments of the invention, locational data is provided via global positioning system.

In some embodiments, the geographic location associated with the business is a store.

In some embodiments, the advertisement is considered to have failed when the mobile unit does not enter the geographic location within the predetermined amount of time.

In some embodiments, the advertisement is considered to have failed when the mobile unit moves to a distance from the geographic location greater than a predetermined distance.

In some embodiments, purchase information is written to the database when a user associated with the mobile device makes a purchase at the store.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

Figure 1:
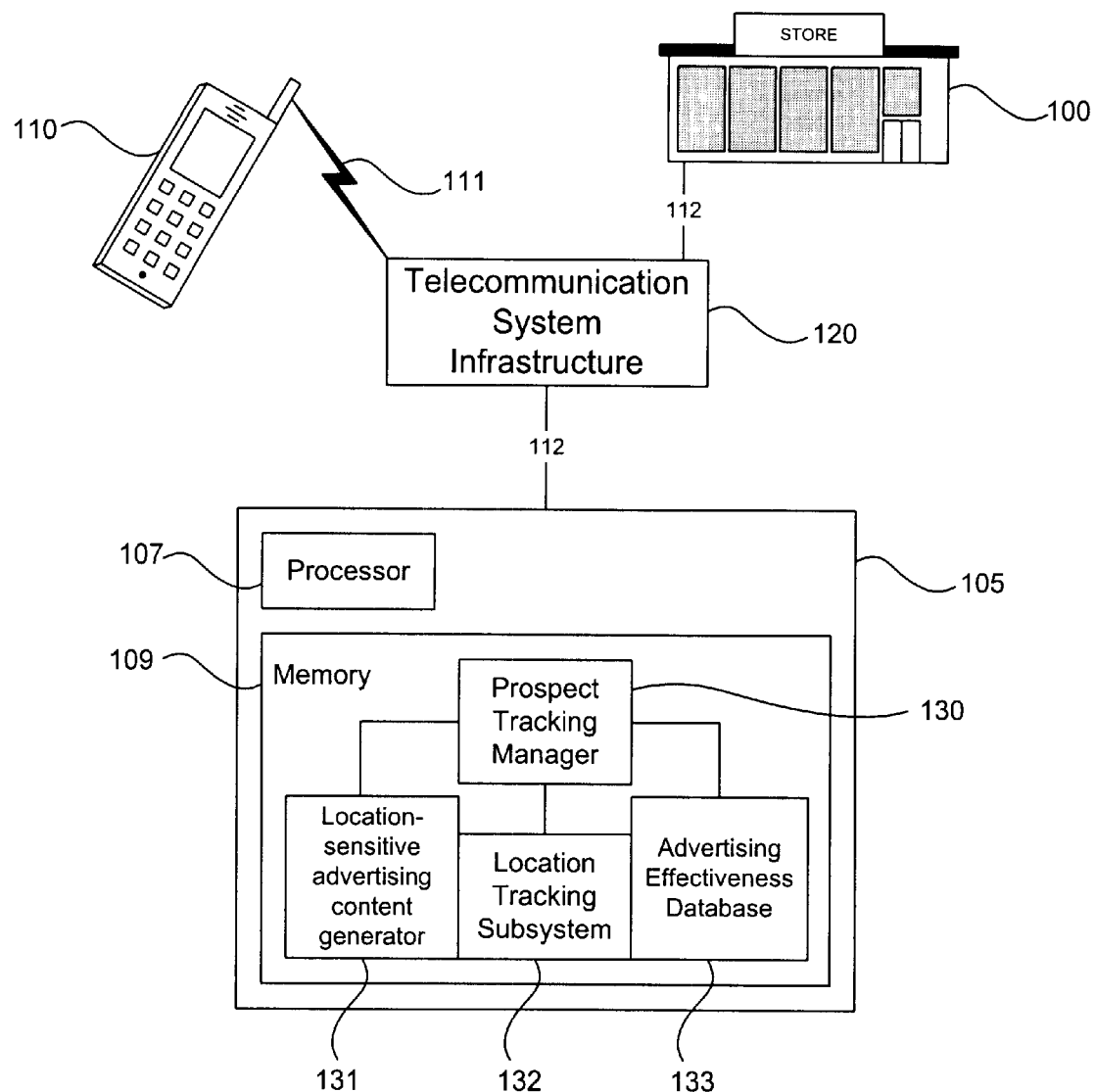
FIG. 1 illustrates a telecommunication system adapted for use with an embodiment of the invention.

Monitoring advertising effectiveness (i.e. whether the advertisement produced an intended result) is crucial to determining which advertising techniques work well, and it may also be used to arrange structured payment of advertising fees. Aspects of the invention described herein exploit location information to track the effectiveness of an advertising event by monitoring whether a user of a mobile device alters his or her behavior in response to receiving the advertisement on a mobile device. For example, if a store advertises a sale using a message sent to a wireless device, the advertisement may be considered effective if the user visits the store and/or makes a purchase at the store within a reasonable time interval after receiving the advertisement. On the other hand, an advertisement would be considered ineffective in a particular case if the user fails to modify his or her behavior, such as for example failing to visit a store that advertised a sale event to the user through his or her mobile communications device.

The following definitions apply in describing the invention herein:

SU (Stationary Unit): a non-mobile telecommunication transmitter, transceiver, or receiver capable of supporting a connection. Typically connected to the telecommunication infrastructure using wire or fiber links. This includes, but is not limited to, a traditional "land-line" telephone, or a computer adapted with a hardwired connection such as a DSL connection, a cable-modem connections, or other non-wireless modem or network connection.

MU (Mobile Unit): a mobile telecommunication transmitter, transceiver, or receiver capable of supporting a connection. Typically connected to the telecommunication infrastructure using wireless links. Examples include cell phones, pagers, wireless web browsers, personal digital assistants, and laptop/handheld/wearable computers.

TU (Telecommunication Unit): a telecommunication transmitter, transceiver, or receiver that is either a MU or a SU.

CONNECTION: a data transfer path among a plurality of TUs. In the preferred embodiment this data transfer path can be used for voice, data, or any other purpose known in the art. In general it is a continuous, "circuit switched" connection or emulation thereof, but in the preferred embodiments it is better viewed as a one-time data transfer connection for sending advertising messages. A special case of a connection particularly relevant to advertising is the transmission of a SMS (Short Message Service) text message using current technology, such as GSM.

CALL: any instantiation of a CONNECTION to a TU.

CALLER: the TU that requests creation of a connection.

CALLEE: a TU that is added to a connection responsive to a caller having initiated creation of that connection.

USER: a generic term for caller, callee, or TU whether or not it is involved in a connection. A TU is associated with a person (hence the term "user"), but might well be an automated system connected to the telecommunication infrastructure in the case of a system generating advertising content. The word "user" is therefore an anthropomorphization to simplify descriptions, and does not restrict applicability to only human users.

BUSINESS: a generic term for any entity that seeks to use advertising to influence user behavior, be it a non-profit organization, a store selling goods, a service provider, or a government institution. Similarly, a STORE is a generic term for the physical place-of-business, regardless of actual purpose.

ADVERTISEMENT: any connection created for the purpose or intent of informing, influencing, or otherwise conveying information to a user, when the purpose of creating the connection furthers the interests of a business. The business benefiting from a particular advertisement is said to be sponsoring that advertisement, regardless of the actual financial arrangement used to pay for the advertisement.

PROSPECT: a user associated with a MU that has been identified to receive or has recently received an advertisement.

Referring to FIG. 1, a business, exemplified by store 100, sends advertising content to a mobile telecommunication unit (MU) 110 responsive to the location of MU 110. The organization of the system in FIG. 1 is as follows. Advertising tracking system ("tracking system") 105 comprises a computer with a processor 107 and memory 109. Memory 109 may be a volatile memory, non-volatile memory, or a combination of the two, and may be used to store a prospect tracking manager 130. The prospect tracking manager 130 is responsible for providing the functionality of the invention using various subsystems, and for directing the flow of the logic illustrated by the flowchart in FIG. 2. Advertisement tracking system 105 may comprise a single server computer, or be distributed over multiple servers, based on the size, distribution, and location of the mobile telecommunication system being served.

Advertising tracking system 105 further comprises a location tracking subsystem 132. Tracking subsystem 132 uses location information provided by telecommunication system 120 to monitor the geographic location of a plurality of MUs 110 served by the telecommunication system 120. The locations may then be compared to a database of predetermined locations as beneficial to the operation of generation subsystem 131. For example, tracking subsystem 132 notifies tracking manager 130 when a user is near a particular business that desires to advertise for customers, and may also notify tracking manager 130 when a user has entered a particular business's store location.

Advertising tracking system 105 further comprises a location-sensitive advertising generation subsystem 131 that is capable of generating relevant advertising content given the location of a user and the business(es) relevant to that location. For example, if a particular user is close to a store having a sale that includes goods typically purchased by that user, generation subsystem 131 may create an advertisement stating that a particular set of goods relevant to the user is on sale at the relevant nearby store. The determination of when to send advertisements may be based on a profile associated with each user. The profile may specify the user's interests, types of advertisements he or she desires to receive, times of day that the user does/does not want to receive advertisements, and like information. The distance within which a MU must be with respect to a store before an advertisement is fired to the MU may be any predetermined distance, for example fifty meters, and may vary by MU, by store, or the like.

Advertisements may be sent regarding complementary businesses. For example, if a user has exited a movie theater, generation subsystem 131 may generate an advertisement relevant to a proximately located coffee shop or other entertainment venue nearby to the movie theater.

Advertisements may also be sent for competing businesses. For example, generation subsystem 131 may, upon detecting entry of a user to a particular business location, generate an advertisement for goods or services at lower prices at some other competing business.

Advertising tracking system 105 further optionally comprises an advertising effectiveness database 133. This database at a minimum records instances in which the sending of advertising content to a particular MU 110 was subsequently followed by a visit of the user of MU 110 to the store 100 of the business being advertised. Optionally, the database may also record instances when the user makes a purchase from the advertised store 100 or whether goods purchased by the user in the store relate to the goods referred to in the advertisement. Other data that may also be recorded in database 133 includes the time elapsed between the advertisement and the visit/purchase, and the distance between MU 110 and store 100 at the time of the advertisement for use in later advertising effectiveness analysis. It is also possible that the database records when the MU's directional movement changes favorably toward a store 100 after receiving an advertisement for that store and/or business.

Also shown in FIG. 1 are a wireless telecommunication link 111 connecting MU 110 to the telecommunication infrastructure 120. Additionally, telecommunication links 112 connect advertising tracking system 105 to infrastructure 120, and optionally connect store 100 to infrastructure 120.

Figure 2:
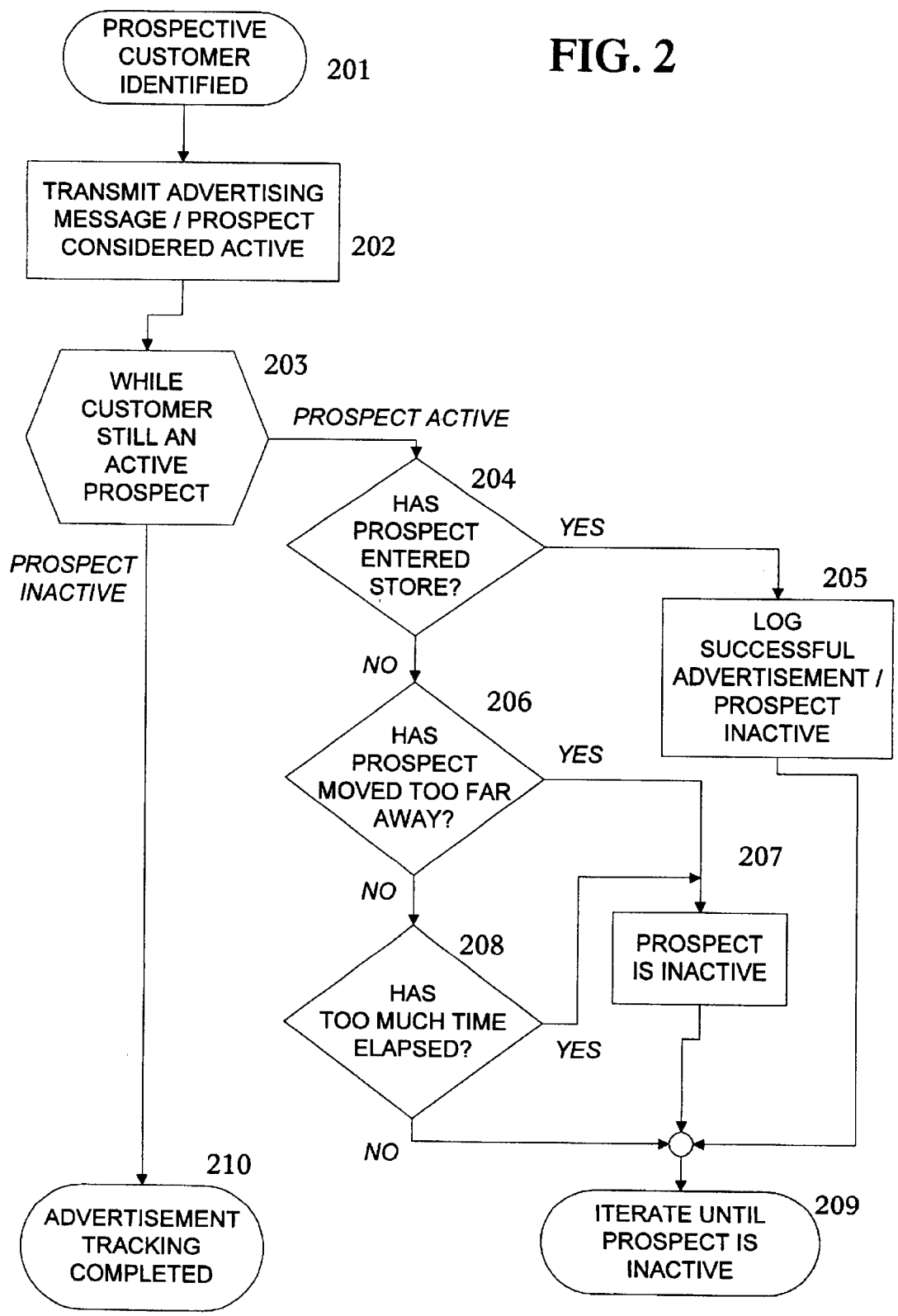
FIG. 2 illustrates a flow chart for sending an advertisement and tracking its effectiveness.

FIG. 2 illustrates the operation of one embodiment of the invention. Operation starts with the identification of a prospective customer in Step 201. This identification would be responsive to the location of the prospect (preferably the situation in which a prospect is within a predetermined radius of a predetermined point such as the front door of a store), optionally filtered by customer profile information. Advertisements may also be filtered by profile information associated with the sponsoring business. In particular, time of day is preferably used as a filtering factor to avoid sending an advertisement for a business that is currently closed, and to avoid sending an advertisement to a MU at a time when the user has requested not to receive advertisements.

Once a prospect has been identified, Step 202 uses location-sensitive advertising content generation subsystem 131 to create a tailored advertising message responsive to the prospect's location, and send it via telecommunication infrastructure 120 to the prospect's MU 110. At this point the prospect is considered "active" in that the advertisement has been delivered and that the prospect can respond to that advertisement.

While a prospect is considered active, Step 203 continually monitors the location of the prospect in a loop comprising Steps 204 through 209. Step 204 checks whether a prospect has entered store 100 relevant to the advertising content sent by Step 202. The specific mechanisms used to perform this check are discussed below.

If a prospect has in fact entered the store relevant to the advertising content sent in Step 202, the advertisement is considered a success and logged in Step 205. The logging may include writing information pertaining to the successful advertisement, such as the time the advertisement was delivered, the time the user entered the store, and any other information associated with the successful advertising event. The logging may also include purchase information, such as the item purchased at the store, the time of purchase, and the like. Concurrent with this logging, the prospect status is changed to be considered inactive. In one embodiment the well-known concept of hysteresis in either time or location would be used to prevent the generation of another advertising message to a customer who has just responded to an advertisement and has not yet left the area used to trigger advertising.

If the prospect has not entered the store, Steps 206 and 208 continue to monitor the prospect's location to determine whether the prospect is likely to respond to the advertisement. Step 206 determines if a prospect has moved so far from the desired store location (preferably exceeding a predetermined threshold distance greater than the distance used to generate the advertisement) that the advertisement is considered to have failed. Step 208 determines whether too much time has elapsed from the generation of the advertising content in step 202. As an example, someone working in the same building as a store might be considered inactive after spending more than thirty minutes within the same building as the store but not within the store on the assumption that the worker has bypassed the store to go to his/her office or another nearby store. The amount of time may be any predetermined amount of time, and may vary by prospect or by store.

If either Step 206 or Step 208 determine that the prospect is unlikely to respond to the advertising content sent, Step 207 is executed to mark the prospect inactive. This may optionally include writing failure information to the database, such as recording the time the advertisement was sent, incrementing a failure counter, or the like.

Step 209 terminates the loop of Step 203, and continues iteration while the prospect is considered active, continuing to Step 210 when the prospect is inactive either due to having responded to the advertisement or being considered no longer a prospect based on distance increases or lengthy time delays.

In one embodiment of the invention a direct position measurement is used to determine when a prospect enters a sponsoring business' store. This is preferably implemented with a highly accurate mobile telecommunication location technology. How such position information is provided is beyond the scope of this invention, but such technologies include, for example, GPS technology without selective availability restrictions, differential GPS technology or other approaches becoming known in the art. It is only important that the positioning technology be accurate enough to establish that a prospect visits a sponsoring business with an acceptably low false alarm rate—perfect positioning information is not required. Physical store characteristics such as large parking lots that provide separation between stores may be used reduce the needed accuracy for position information while holding false alarms to a low level.

With reference to FIG. 1, in an embodiment where the MU's location is determined by an independent locational technology such as GPS, link 112 between store 100 and telecommunication system infrastructure 120 might not be used, because the location of MU 110 is determined using technology independent of the store. However, link 112 may be used to report whether the prospect purchased the advertised goods, or any other goods, from the store 100.

Another embodiment uses indirect measurement techniques to determine whether the user of MU 110 has responded to advertising content. In many current systems location information is accurate enough to determine proximity to a store location, but not accurate enough to determine if a customer enters an urban store or shopping mall store as opposed to simply walking by it (stand-alone suburban stores with large parking lots do not present this problem because pedestrians typically do not walk in the vicinity of stores other than ones they are specifically visiting). Thus, indirect measures must be used to infer that the advertising was effective. Different approaches have different degrees of effectiveness, but should be preferably combined whenever possible for maximum advantage. The embodiment may use any combination of the following techniques:

A first technique is to monitor the general location of MU 110 over a period of time to see if traveling of the prospect ceased in the general vicinity of store 100 even if insufficient positioning accuracy is available to determine whether the prospect visited the store or merely stopped nearby it. This provides suggestive evidence that the advertisement caused the user of MU 110 to stop and shop at store 100 even if no purchase is recorded or there is insufficient information to tie a purchase to the user of MU 110. Preferably, such cessation of motion is screened for false alarms if the area in which such cessation took place was historically common, for example indicating the location of the user's work or home location.

A second technique is to monitor the travel direction of MU 110 to see if it reacts to the advertisement. For situations in which user intent is being inferred from movement data, the accuracy of the locating technology need only be good enough to determine movement trends. For example, if an advertisement is triggered when a prospect is within a predetermined radius of the business, such as 500 meters, the locating technology need only be accurate enough to determine a positive reaction from a prospect if it can tell that the prospect has moved toward the sponsoring business' store, for example entering within a 100 meter radius of the store using a locating technology with 100 meter accuracy even if the store is much smaller than 100 meters in size. To refine this scenario further, cessation of movement could be detected within such a minimum radius for a duration of time consistent with either making the desired transaction or investigating the advertised product. Such a duration of time could be, for example, the time it would take for the prospect to park a car, walk to the store, and find the merchandise, and could be customized for each business.

A third technique is to monitor the store's financial system (upon agreement with the business) for purchase information, and correlate the identity of a purchaser via credit card, affinity membership card, verbally requested phone number, etc., to ownership of MU 110 to infer that a purchaser received an advertisement associated with the purchase that was made. This could include simply the fact that a purchase was made, but preferably also includes whether the purchased goods correspond to the scope of the advertisement.

A fourth technique is to offer a specific discount via the advertising content generated in Step 202, and record the fact that the particular discount offered was used in a sale at store 100. Preferably each discount advertised has a unique serial number to tie it unambiguously to a particular advertisement. Alternately, the discount may require the purchaser to provide the phone number of MU 110 to receive the discount, creating a direct tie to the MU and any sent advertisements.

It should be recognized that any one of the above techniques is sufficient to provide acceptable results.

A possible variant of the above embodiments is to infer the effectiveness of advertisements by analyzing the movement patterns of a customer after an advertisement is received. For example, if a customer changes direction toward a business being advertised within a few minutes after an advertisement is received, then it can be inferred that the advertisement has been effective even if precise information is for some reason not available as to whether the customer actually enters the destination store.

Another variant of the embodiments discussed above is a system that creates and sends advertising content, but does not track the effectiveness of advertising (i.e., incorporates the elements of FIG. 1 except for effectiveness database 133, and has an operation corresponding only to steps 201, 202, and 210 in FIG. 2).

A different variant of both the embodiments discussed above is a system which does not create nor send advertising content, but only tracks the effectiveness of advertising after it has been sent (i.e., incorporates the elements of FIG. 1 except for location-sensitive advertising content generation subsystem 131, and has an operation according to FIG. 2 in which step 202 is omitted and identification of a prospect is made by being informed by some other system that advertising content has already been delivered).

Among the benefits of this invention is the flexible ability to select one or more callees in a population of MU users based on location information, and generate advertisements responsive to location and other filtering factors. This provides advertising content for proximate businesses or businesses otherwise related to a specific location that is delivered just when the user of the MU is most likely to respond to the advertisement.

Another benefit of the invention is tracking the effectiveness of advertisements. In a basic scheme, this effectiveness tracking can be used to test the effectiveness of advertising approaches, and may also be used in an effectiveness-based advertising rate arrangement. Additionally effectiveness may be used to adapt the behavior of generation subsystem 131 to generate only advertisements to which the user of each particular MU 110 is historically prone to respond.

The notion of an advertisement in this invention is intended not only to encompass traditional advertisements, but also any and all techniques for displaying information on a MU to the benefit of a group, organization, business, or individual. A specific form of advertisement relevant to World-Wide Web access via an MU is known as a referral, in which advertising within the content of one web page consists of a link to some other web page. Effectiveness of such referrals is traditionally measured via click-thru measurements in which the advertisement is considered successful if the user activates the referral link to visit the advertiser's own web page. A significant benefit of this invention is that measurement of advertisement effectiveness (and compensation for carrying advertising content) can additionally be linked to whether the user actually visits the physical site of the business advertised. This is advantageous compared to traditional click-thru measurements in that it measures the true effect of the advertisement rather than whether the clicked advertisement page was viewed. Additionally, this approach is invulnerable to click-thru problems such as misrepresentation of click-thru links to artificially drive up advertising revenue when in fact the prospects doing the click-thru are not bona fide prospects but rather victims of misrepresentation of the link being clicked. Of course, the fact that the link is presented responsive to location is an advantage shared among all applications of this invention.

Notions of distance in this invention are intended to encompass not only literal distance measures, but additionally any and all measures conducive to identifying whether a particular user is close enough to a predetermined location to be likely to respond to an advertisement. For example, distance might be expected travel time via foot or vehicle from current location to a store. Distance might also be the distance between the user and a predetermined point that is not exactly the store. For example, a purveyor of clothing might wish to advertise the availability of dry clothes to visitors of a waterfall so that they can purchase towels and fresh clothing changes, in which case distance would be measured to the exit of the waterfall rather than the store itself. Alternately, a store selling picture postcards and other memorabilia may desire to advertise that fact to prospects when they reach the exit or shopping area of a tourist attraction.

The term "connection" bears specific discussion. Although the notion of a connection obviously encompasses traditional voice phone calls, it furthermore encompasses any and all modalities of data transfer between TUs. This includes, for example, voice phone calls, video phone calls, digital camera picture transfers, general multimedia data transfers, television feeds, movies, e-mail, voice mail, pre-recorded messages, data to create synthesized/reconstructed voice messages, map information, geographic coordinate data, World Wide Web content and World Wide Web pointers. Clearly there are many types of data that can be transferred, and the term "connection" is intended to apply to anything that can be transferred over a telecommunication system.

The terms "telecommunication infrastructure" and "telecommunication system" and similar terms are to be interpreted as broadly as possible within the known and future art. In particular, such approaches to delivering telecommunication data include not only phones and phone-based systems such as DSL (digital subscriber line), but also cable TV systems, and any and all data networks, include those established within specific buildings or other areas. Similarly, it is assumed that location information is generically available regardless of whether it is integrated into the telecommunication system or provided by some alternate means.

Finally, it is possible that in some instances the usually static notion of location will actually refer to a moving location. For example, the "location" of the umbra of a solar eclipse moves over time, but it could be worthwhile to create a system that notified appropriate users that they can purchase viewing glasses from a nearby store when the eclipse is about to occur at a particular geographic area (thus, the location is the moving edge of the eclipse shadow rather than a fixed geographic coordinate point).

When considering whether the various embodiments are appropriate for a particular application, one must consider that the effectiveness of the locating technology depends on both the physical size of the business offering the advertisement as well as the magnitude of the radius in which the advertisements are delivered to the MUs. If the extent of the business and any surrounding buffer zone (e.g., parking lots) is considerably larger than the resolution of the locating technology, then the method described in the first embodiment may be sufficient to directly determine the prospect's presence in the business following the advertisement delivery. In this case, a 100 meter resolution typical of currently available MU locating technologies may be sufficient for relatively large businesses such as a supermarket or a department store.

Inferred advertising effectiveness may be refined by monitoring statistical information about MU user travel patterns and measure effectiveness of advertising by measuring the difference of a prospects travel pattern from MU users not receiving advertising. For example, some MU prospects might not be given an advertisement, and then monitored to see if they appear to enter the potentially sponsoring store (either actually entering it, or merely entering the general vicinity if accurate positioning technology is not available). Then, the percentage of MU prospects who do receive an advertisement could be compared with the ones not receiving the advertisement to determine the effectiveness of that advertisement process.

One or more aspects of the invention may be implemented by storing computer readable instructions on a computer readable medium such as a hard drive, optical disk, removable storage device, or on any other non-volatile memory device.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for analyzing an advertisement received by a mobile communications device, comprising the steps of:
    (i) automatically monitoring the device's geographic location subsequent to receiving advertising data;
    (ii) writing success information to a database if the mobile device enters within a predetermined period of time a geographic location corresponding to a business with which the advertising data is associate; and
    (iii) writing failure information to the database if the mobile device does not enter the geographic location corresponding to the business within the predetermined period of time.

2. The method of claim 1, wherein step (i) comprises receiving location data from a global positioning system.

3. The method of claim 1, wherein the geographic location associated with the business is a store.

4. The method of claim 3, further comprising the step of writing purchase information to the database responsive to a user associated with the mobile device making a purchase at the store.

5. The method of claim 4, further comprising the step of writing second success information to the database when the purchase comprises goods with which the advertisement is associated.

6. The method of claim 1, wherein the predetermined amount of time varies by business.

7. The method of claim 1, wherein the predetermined amount of time varies by mobile device.

8. The method of claim 1, further comprising the step of writing failure information to the database when the mobile device moves to a distance greater than a predetermined distance from the geographic location.

9. The method of claim 1, wherein success information comprises time elapsed between a time that the advertisement data was sent to the mobile device and a time that the mobile device entered the geographic location.

10. The method of claim 1, wherein success information comprises a distance of the mobile device to the geographic location at a time when the advertisement data was sent to the mobile device.

11. An apparatus for analyzing an advertisement received by a mobile communications device, comprising: a processor; memory for storing a database and computer readable instructions that, when executed by the processor, cause the apparatus to perform the steps of:
    (i) automatically monitoring the device's geographic location subsequent to receiving advertising data;
    (ii) writing success information to a database if the mobile device enters within a predetermined period of time a geographic location corresponding to a business with which the advertising data is associated; and
    (iii) writing failure information to the database if the mobile device does not enter the geographic location corresponding to the business within the predetermined period of time.

12. The apparatus of claim 11, wherein step (i) comprises receiving location data from a global positioning system.

13. The apparatus of claim 11, wherein the geographic location associated with the business is a store.

14. The apparatus of claim 13, wherein the computer readable instructions further comprise the step of writing purchase information to the database when a user associated with the mobile device makes a purchase from the store.

15. The apparatus of claim 14, wherein the computer readable instructions further comprise the step of writing second success information to the database when the purchase comprises goods with which the advertisement is associated.

16. The apparatus of claim 11, wherein the predetermined amount of time varies by business.

17. The apparatus of claim 11, wherein the predetermined amount of time varies by mobile device.

18. The apparatus of claim 11, wherein the computer readable instructions further comprise the step of writing failure information to the database when the mobile device moves to a distance greater than a predetermined distance from the geographic location.

19. The apparatus of claim 11, wherein success information comprises an elapsed time between a time that the advertisement data was sent to the mobile device and a time that the mobile device entered the geographic location.

20. The apparatus of claim 11, wherein success information comprises a distance of the mobile device to the geographic location at a time when the advertisement data was sent to the mobile device.

21. A computer readable medium comprising computer readable instructions that, when executed by a processor, cause a data processing device to analyze an advertisement received by a mobile communications device by performing the steps of:
   (i) automatically monitoring the device's geographic location subsequent to receiving advertising data;
   (ii) writing success information to a database if the mobile device enters within a predetermined period of time a geographic location corresponding to a business with which the advertising data is associated; and
   (iii) writing failure information to the database if the mobile device does not enter the geographic location corresponding to the business within the predetermined period of time.

22. The computer readable medium of claim 21, wherein step (i) comprises receiving location data from a global positioning system.

23. The computer readable medium of claim 21, wherein the geographic location associated with the business is a store.

24. The computer readable medium of claim 23, wherein the computer readable instructions further comprise the step of writing purchase information to the database when a user associated with the mobile device makes a purchase from the store.

25. The computer readable medium of claim 24, wherein the computer readable instructions further comprise the step of writing second success information to the database when the purchase comprises goods with which the advertisement is associated.

26. The computer readable medium of claim 21, wherein the predetermined amount of time varies by business.

27. The computer readable medium of claim 21, wherein the predetermined amount of time varies by mobile device.

28. The computer readable medium of claim 21, wherein the computer readable instructions further comprise the step of writing failure information to the database when the mobile device moves to a distance greater than a predetermined distance from the geographic location.

29. The computer readable medium of claim 21, wherein success information comprises an elapsed time between a time that the advertisement data was sent to the mobile device and a time that the mobile device entered the geographic location.

30. The computer readable medium of claim 21, wherein success information comprises a distance of the mobile device to the geographic location at a time when the advertisement data was sent to the mobile device.

31. A method for analyzing an advertisement sent to a mobile device, comprising the steps of:
   (i) subsequent to receiving advertising data, autonomically monitoring the device's geographic location by receiving location information from a global positioning system associated with the device;
   (ii) when, within a predetermined amount of time, the mobile device enters a geographic location associated with a business to which the advertising data refers, writing success information to the database;
   (iii) when the predetermined amount of time in step (ii) elapses without the mobile device entering the geographic location, writing failure information to the database; and
   (iv) writing failure information to the database when the mobile device moves to a distance greater than a predetermined distance from the geographic location.

32. The method of claim 31, further comprising the steps of:
   (v) writing purchase information to the database when a user associated with the mobile device makes a purchase from the business; and
   (vi) writing second success information to the database when the purchase comprises goods referred to in the advertising data.

33. A system for analyzing an advertisement received by a mobile communications device, comprising: a processor; memory for storing a database and computer readable instructions that, when executed by the processor, cause the apparatus to perform the steps of:
   (i) subsequent to receiving advertising data, automatically monitoring the device's geographic location by receiving location information from a global positioning system associated with the device;
   (ii) when, within a predetermined amount of time, the mobile device enters a geographic location associated with a business to which the advertising data refers, writing success information to the database;
   (iii) when the predetermined amount of time in step (ii) elapses without the mobile device entering the geographic location, writing failure information to the database; and
   (iv) writing failure information to the database when the mobile device moves to a distance greater than a predetermined distance from the geographic location.

34. The system of claim 33, further comprising the steps of:
   (v) writing purchase information to the database when a user associated with the mobile device makes a purchase from the business; and
   (vi) writing second success information to the database when the purchase comprises goods referred to in the advertising data.

35. A computer-readable medium, having instructions contained thereon, which, when executed by a processor, cause a system to perform the steps of:

(i) subsequent to receiving advertising data, automatically monitoring the device's geographic location by receiving location information from a global positioning system associated with the device;

(ii) when, within a predetermined amount of time, the mobile device enters a geographic location associated with a business to which the advertising data refers, writing success information to the database;

(iii) when the predetermined amount of time in step (ii) elapses without the mobile device entering the geographic location, writing failure information to the database; and (iv) writing failure information to the database when the mobile device moves to a distance greater than a predetermined distance from the geographic location.

36. The computer-readable medium of claim 33, further comprising the steps of:

(v) writing purchase information to the database when a user associated with the mobile device makes a purchase from the business; and (vi) writing second success information to the database when the purchase comprises goods referred to in the advertising data.

37. The method of claim 33, wherein the monitoring step includes monitoring the movement patterns of the device to determine if it reacts to the advertising data.

* * * * *

UNITED STATES PATENT AND TRADEMARK OFFICE
CERTIFICATE OF CORRECTION

PATENT NO. : 6,647,269 B2
DATED : November 11, 2003
INVENTOR(S) : Geoffrey R. Hendrey et al.

It is certified that error appears in the above-identified patent and that said Letters Patent is hereby corrected as shown below:

Column 10,
Line 14, replace "associate" with -- associated --.

Column 12,
Lines 10 and 11, replace "autonomically" with -- automatically --.

Signed and Sealed this

Sixth Day of July, 2004

JON W. DUDAS
*Acting Director of the United States Patent and Trademark Office*